United States Patent [19]

Seidler

[11] 4,389,632
[45] Jun. 21, 1983

[54] FLASHER UNIT WITH SYNCHRONIZATION AND DAYLIGHT CONTROL

[76] Inventor: Robert L. Seidler, 104 Ridgewood Dr., Longwood, Fla. 32750

[21] Appl. No.: 277,087

[22] Filed: Jun. 25, 1981

[51] Int. Cl.³ .................... B60Q 1/26; H05B 39/00
[52] U.S. Cl. ................................ 340/74; 340/81 R; 340/114 B; 340/332; 116/18; 315/200 A
[58] Field of Search ................... 340/74, 81 R, 46, 84, 340/87, 82, 83, 331, 114 R, 114 B, 332, 41 R, 32, 35; 315/200 A, 200 R, 201, 252, 312, 88, 89; 307/247 R, 273, 311, 255; 116/18-22 R

[56] References Cited
U.S. PATENT DOCUMENTS

3,855,586 12/1974 Jacobs ................................ 315/89

Primary Examiner—Donnie Lee Crosland
Attorney, Agent, or Firm—Duckworth, Allen, Dyer, & Pettis

[57] ABSTRACT

A flasher unit for buoys, beacons and the like for flashing an incandescent lamp in a required sequence of short and long flashes having short or long eclipses between flashes. A counter is provided having a number of counts equal to the number of flash-eclipse pairs required. A timing pulse generator is selectively controlled to produce timing pulses during each count that are temporally spaced in accordance with the flash-eclipse time durations during each count. Certain ones of the timing pulses serve to clock the counter. Lamp control pulses are generated during each count for energizing the lamp for the preselected time duration. A sync pulse is generated at the beginning of every flash and a second pulse during the first flash in a sequence. These pulses are externally available and are communicated to other flasher units for synchronization. The unit will also synchronize to incoming sync pulses. A photocell circuit inhibits flashing during daylight periods.

13 Claims, 6 Drawing Figures

FLASHER UNIT WITH SYNCHRONIZATION AND DAYLIGHT CONTROL

BACKGROUND OF THE INVENTION

1. Field of the Invention

The present invention relates to lamp flashers and more particularly to apparatus for flashing lamps in particular code sequences and for synchronizing a number of lamp flashing systems.

2. Background of the Invention

Marine buoys and beacons commonly use incandescent lamps which are periodically flashed in various sequences of short and long flashes separated by short and long eclipses for identification of channels, obstructions and other navigational features. Many such devices are battery operated and conservation of primary power is important. In recent years, older flashing systems using motors and relays have been supplanted by transistor timing and control circuits. For example, see the following U.S. patents to Seidler: U.S. Pat. Nos. 3,244,892; 3,310,708; and 3,596,113. To obtain reliability and accurately timed signals, voltages must be regulated. To eliminate relays, transistor switches have been used. Prior art regulating and switching transistors have generally been germanium types to minimize voltage drops; however, these types have high leakage, especially at high temperatures. Lower leakage at high temperatures can be obtained with the use of silicon transistors but at the expense of higher voltage drops.

In many applications, a number of beacons or buoys are required to operate in synchronism, and generally, a master flasher controls a set of slave units. When the master fails, improper operation of the slaves is common. A need exists for a flexible easily programmable flasher control circuit that will minimize primary power drain, that will permit any unit to synchronize the remaining units, that will not fail when other units fail, and which will permit almost any coded signals to be generated.

SUMMARY OF THE INVENTION

The invention is a new and improved lamp control system that overcomes problems common to prior art systems. The voltage regulator and switching circuits utilize silicon transistors having low leakage in a novel connection that produces low voltage drops. The current to the lamp is monitored during flashes and a lamp change switch is closed when a lamp failure is detected energizing an automatic lamp changer.

A solid-state flash sequence generation circuit is provided using, for the most part, integrated logic circuits. Almost any code sequence or sequence of short and long flashes and eclipses can be generated. The sequence generator utilizes an electronic counter which produces a count for each sequential flash and eclipse pair. A set of electronically switched RC time constants are controlled from the counter to produce the desired flash and eclipse durations of each successive set of a flash and eclipse. The selected time constants for a given flash-eclipse period controls a timing generator which clocks the counter at the beginning of each such flash-eclipse period.

When a number of flashers are to be operated together, the invention permits synchronization of the flashes and eclipses. Sync pulses are produced at the beginning of each flash and are fed to a cable or other link to the other flasher units in the system. If all units are not in synchronization, the sync pulses will cause all of the other units to reset and synchronize. Advantageously, any unit can serve as the master and the remainder as slaves. Therefore, failure of a master will not affect the other units.

A daylight control is also provided to disable the flashes during the day, thereby conserving primary power. When darkness falls, the daylight control will cause at least one flasher to begin operation. The sync pulses from the first enabled unit will automatically cause the remainder to operate, regardless of whether their daylight controls have been triggered. In the morning, all units will remain operating until the least sensitive daylight control is operated at which time all units will cease flashing. Therefore, if a very sensitive daylight control on a flasher attempted to prematurely disable that unit, the sync pulses from the other units would maintain operation thereof, providing a fail-safe system.

It is therefore a pinciple object of the invention to provide a flasher unit for use in a system of synchronized flasher units which can be programmed to produce a desired sequence of short and long flashes separated by short and long eclipses and which produces synchronization pulses for synchronizing other externally-connected flasher units therewith.

It is another object of the invention to provide a flasher unit having a daylight control for use in a system of multiple units interconnected by communication links, all units having a daylight control circuit and arranged such that all units will continue flashing until the least sensitive daylight control unit inhibits its flasher unit; and in which the first flasher unit to be enabled with a drop in ambient light will cause all other units to begin flashing.

It is yet another object of the invention to provide a flasher unit having a silicon transistor switch and regulator having a low voltage drop across the regulator when the supply voltage falls below the regulated value.

It is a further object of the invention to provide a switch and voltage regulator using silicon transistors connected to produce a darlington circuit for a first current level and to change to a single regulator circuit at a second current level.

It is another object of the invention to provide a switch and regulator using a darlington circuit modified to permit driving the switching transistor to a preselected low voltage drop.

It is still a further object of the invention to provide a lamp current sensing circuit to determine when a lamp has failed and to thereafter energize an automatic lamp changing mechanism.

It is another object of the invention to provide a novel lamp flash sequence generating circuit using integrated logic circuits which minimize power drain on the power source and which have long life and low cost.

It is still another object of the invention to provide a sequence generating circuit permitting selection of a very large variety of short and long flash sequences without the use of mechanical devices, relays, or motors.

It is yet another object of the invention to provide a sequence generating circuit utilizing a steppable counter controlled by timing pulses in which a first timing pulse steps the counter to the next count, in which the time to the next timing pulse is controlled in accordance with the length of the required flash and eclipse for that count, and in which the next timing pulse is generated causing the counter to step to the next count.

These and other objects and advantages of my flasher system will be apparent from the following detailed description and the drawings.

DETAILED DESCRIPTION OF THE PREFERRED EMBODIMENT

Figure 1:
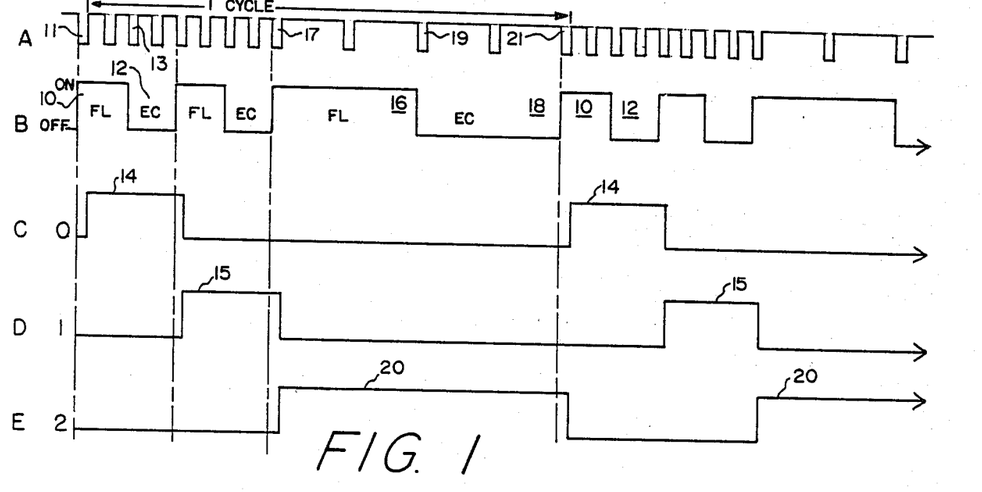
FIG. 1 is a waveform diagram of a simple code sequence for the flasher unit illustrated in FIG. 2.
Figure 2:
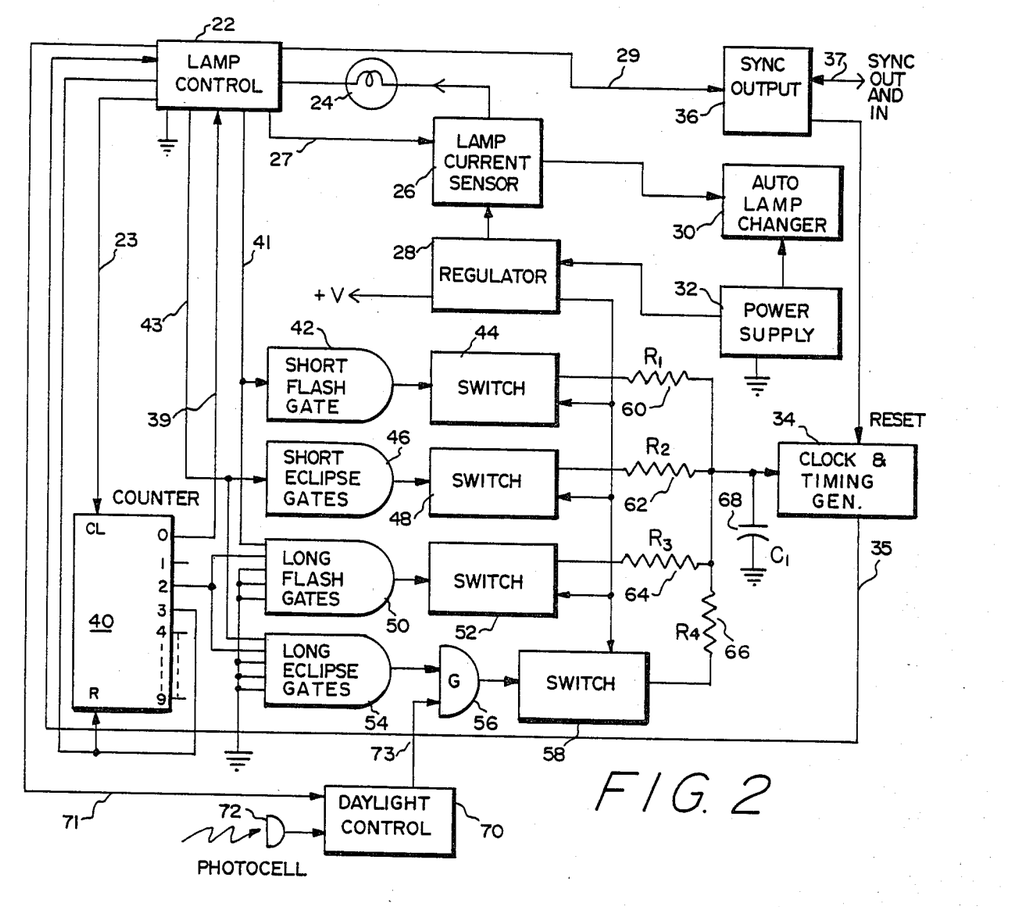
FIG. 2 is a simplified functional block diagram of a flasher unit of the invention.

Referring first to FIG. 2 which provides a greatly simplified functional block diagram of the lamp control and synchronizing system of the invention and to FIG. 1 which illustrates certain waveforms occuring during the operation of the system, the basic mode of operation will be explained. Lamp 24, shown in FIG. 2, may be an incandescent lamp installed in a buoy or on obstructions in a waterway such as an oil drilling platform or the like. It is required to flash lamp 24 in a particular sequence to produce a code for identifying to vessels the significance of the particular buoy or structure. In FIG. 1, a specific light flashing cycle is shown for exemplary purposes only and it is to be understood that a large number of different coded signals may be produced by my invention. Line B shows a sequence of flashes FL in which a code is generated consisting of three code elements; in this case, two short flashes and a long flash, indicative of the Morse code letter U. The first short flash 10 may be, for example, on the order of three tenths of a second. The lamp is then OFF for a short period as indicated at 12. The OFF period, EC, is termed an "eclipse." This eclipse is followed again by a short flash and a short eclipse. The long flash shown at 16 is much longer than the short flash and is indicated as being about three times the short flash length in this example, or about one second. A long eclipse 18 follows the completion of the Morse letter U at which time the coded letter is again repeated. It is to be understood that the flash and eclipse ratios may be varied as desired. An example of one timing is as follows: short flash, ON for 0.3 seconds, OFF for 0.7 seconds; and long flash, ON for 1 second, OFF for 3 seconds.

Referring to FIG. 2, lamp 24 is flashed or turned ON by means of lamp control circuits 22 which close a circuit to one side of lamp 24. Power is supplied from power supply 32 which may commonly be primary or secondary batteries or other types of power supplies. To maintain a long lamp life, the flash output voltage is controlled by regulator 28 which effectively controls the maximum voltage that can be applied to lamp 24. The current which flows through lamp 24 is monitored by lamp current sensor 26. As will be explained in more detail below, a series resistor in the circuit of lamp 24 is not required for current monitoring in accordance with my invention. An indication from lamp control 22 appearing on lead 27 indicates to lamp sensor 26 that lamp 24 is in the ON condition. If, at that time, the lamp current noted is not within the normal limits for lamp 24, a control signal is sent to an automatic lamp changer 30 described in U.S. Pat. No. 3,308,338, which replaces lamp 24 with a new unit. Regulator 28 also includes means for regulating the operating voltage to the electronic flash control circuits of my invention.

Next, the manner in which my invention produces the required control of lamp 24 will be described. A counter 40 is utilized to define the time period for each set of flashes and eclipses such as 10 and 12, and 16 and 18 of FIG. 1. As may be noted, the time period 10 and 12 is much shorter than time period 16 and 18; therefore, counter 40 is controlled to provide different length count periods through its cycle. In the present example, only three count periods are required for producing flashes representative of the Morse code U as shown on line B of FIG. 1. Therefore, in one cycle, counter 40 will step from ZERO count to the ONE count, to the TWO count, and will then automatically reset by virtue of connection of the count THREE output to the reset termination of counter 40. Therefore, the counter cycles, as shown on lines C, D and E, produce a short pulse 14 at the ZERO output, a short pulse 15 at the ONE output and a long pulse 20 at the TWO output.

The control to produce the long and short periods is provided by a set of switches 44, 48, 52 and 58 with associated resistors 60, 62, 64 and 66. At a particular count, the desired resistors are switched so as to charge capacitor 68 ($C_1$) wherein the time constants control the lengths of the flash and eclipse during that output pulse of counter 40. In the present example, resistor 60 ($R_1$) is selected to produce a time constant proportional to the length of the counter output pulses 14 and 15 as will be explained in more detail hereinafter. Switch 44 is controlled by gating circuits 42 to produce a short flash 10 with the necessary gate control signals provided by lamp control circuit 22. Similarly, switch 48 which controls resistor 62 ($R_2$) is controlled by short eclipse gates 46, which are also controlled from lamp control circuits 22. Thus, the value of resistor $R_2$ determines the OFF period 12 of the lamp and, in this application, $R_1$ and $R_2$ may have equal values if equal flash and eclipse durations are required. In some instances the flash and eclipse periods are unequal; for example, a ratio of 3 to 7 is commonly used. In a similar fashion switch 52 and 58 control resistors 64 ($R_3$) and 66 ($R_4$) in which the time constants of the selected resistors in conjunction with capacitor 68 ($C_1$) produces either long flash duration 16 or long eclipse duration 18. To provide the long flash and long eclipse, a set of gates 50 and 54 is used, each having four inputs for this purpose. Therefore, in one cycle, it is possible to have four long flashes and four long eclipses. However, my invention is not limited to this number and it is obvious that additional gating inputs could be provided for this purpose. The selection of the point in a cycle of flashes at which a long flash and a long eclipse is required is selected by connecting an input of gate 50 and of gate 54 to the counter output occurring at the desired point in the cycle. In the present example, the long flash 16 and long eclipse 18 is desired at the third count which is count TWO on line E and therefore inputs from gates 50 and 54 are connected to the count TWO output of counter 40. Since this is the only count in the cycle requiring the long flash and eclipse, the remainder of the gate inputs are grounded.

The control which causes the long and short outputs from counter 40 is provided by use of clock and timing generator 34. As will be described in more detail hereinafter, clock and timing generator 34 produces a sequence of timing pulses on lead 35 to lamp control circuits 22 as shown on line A of FIG. 1. The time between these pulses is controlled by the selection of resistors $R_1$ through $R_4$. The timing pulses may be short pulses in the range of one millisecond to ten milliseconds at the start of each required flash or eclipse and in the center of each flash or eclipse. These timing pulses are directed by lamp control circuits 22 via lead 23 to the clock input of counter 40 causing it to step one count shortly after the beginning of each flash. If the time between the first pulse 11 referred to as a START pulse and the third pulse 13, referred to as a STOP pulse, is short, flash lamp control circuits 22 enable gate 42 on the START pulse and gate 46 on the STOP pulse, both of which occur during count ZERO from counter 40. Thus, resistors 60 and 62 are switched in sequentially. As may be understood, when the START pulse 11 enables gate 42, the short time constant of $R_1C_1$ will cause clock and timing generator 34 to produce the STOP pulse 13 of the pair which causes lamp control circuit 22 to enable short eclipse gate 46. Similarly, when the START pulse 17 of the long flash period occurs as counter 40 steps to produce output pulse 20 on its TWO output, pulse 20 enables one input of gates 50 and 54. A flash pulse will then appear on lead 41 from lamp control circuits 22 to long flash gates 50 which then operate switch 52 to connect resistor $R_3$ to capacitor $C_1$ producing a long time constant for long flash 16. When the STOP timing pulse 19 appears on lead 35 to flash lamp control circuits 22, an eclipse pulse on lead 43 enables long eclipse gates 54, switching resistor $R_4$ on resulting in eclipse period 18.

The invention also includes a daylight control subsystem comprising daylight control circuit 70 and photocell 72. The purpose of this control is to disable the flashing system during daylight hours and to turn on the system at night. As will be explained in more detail below, during daylight or when sufficient incident light falls on photocell 72, clock and timing generator 34 is prevented from producing timing pulses. It is desirable that, when the system is turned on, all units in the system will begin at the beginning of the cycle shown on line B in FIG. 1. To this end, lamp control circuits 22 produce a short synchronizing pulse at the start of each flash and during the first flash of each cycle. In the present example, a sync pulse would occur at the same time as pulse 11 and as the second timing pulse on line A. The sync pulses will appear on lead 29 from lamp control circuits 22 to sync output amplifier 36. The sync pulses are then externally available on output line 37 for purposes described below. The sync pulses also reset clock and timing generator 34 and via control circuits 22, counter 40 to ensure that the first sequence of flashes begins at the start of a cycle.

Figure 3:
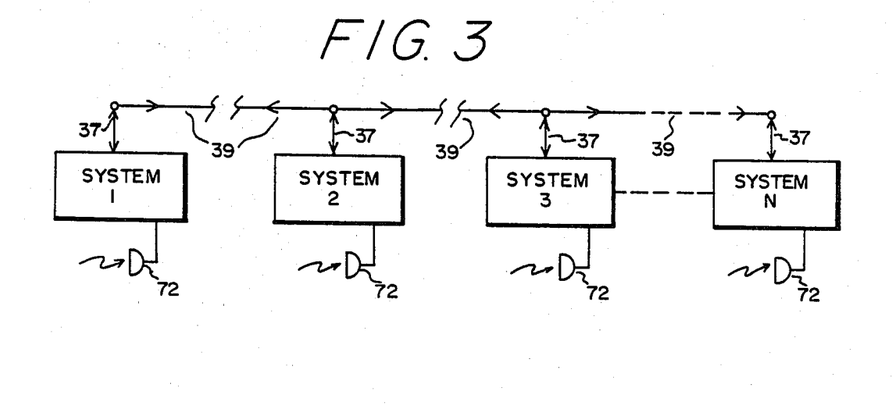
FIG. 3 is a simplified functional diagram of a system of flasher units interconnected by communication links.

Turning now to FIG. 3, an array of N flasher systems is shown, each being of the type illustrated in FIG. 2. As is to be understood, when each of the photocells 72 is exposed to sufficient light, the flasher systems will all be inhibited as previously described. The objective of my invention is to cause all of the systems in the array to come on at the same time and to be synchronized. It is generally not feasible to have the sensitivity of all the photocells identical and, even if this were true, the light incident on each cell would not normally be of the same intensity since each of the systems would be at a different location. For purposes of illustration assume all of the systems are off and that system 2 experiences a sufficient reduction in light on its photocell 72 to start the operation of the flasher as described above. When this occurs, the sync signals appearing on lead 29 from lamp control 22 of FIG. 2 will be sent out on lead 37 via sync output 36. In this instance, the sync pulses will be transmitted via links 39 to system 1, system 3 and the remainder of the systems in the array. Thus, as each of the other systems receive the sync pulses, it resets its clock and timing generator 34 and counter 40, causing each of the systems to override its daylight control 70 which is inhibited by a control signal on lead 71 from flash lamp control circuits 22. It is to be now noted that each system is producing its own sync signals with all sync signals occurring simultaneously and appearing on each output lead 37. When the light conditions change such as to energize photocells 72, it is also an object of my invention to require that all units remain flashing until the least sensitive or last unit to be turned off by daylight control 70 occurs. Assume now that the system 3, photocell 72 is the last unit to receive sufficient light to disable the flashing system. At this time, all of the other units will have been controlled by their photocell to cause daylight control 70 to attempt to stop the unit from flashing. However, the synchronizing pulse from system 3 appearing at the sync input on lead 37 at each of the other systems will again perform the function of keeping each of the units operating. However, when system 3 eventually turns off due to sufficient illumination of its photocell 72, its sync pulse disappears from lead 37 and all systems will therefore turn off at the same time. Although FIG. 3 shows a conductive line 39 between leads 37 of each unit it is to be understood that any type of interconnection can be used as determined by the environment of the systems. For example, a cable connection may be used on large structures such as oil drilling platforms and a radio link may be used for buoys. I do not consider the interconnection means to be a part of my invention.

Figure 4:
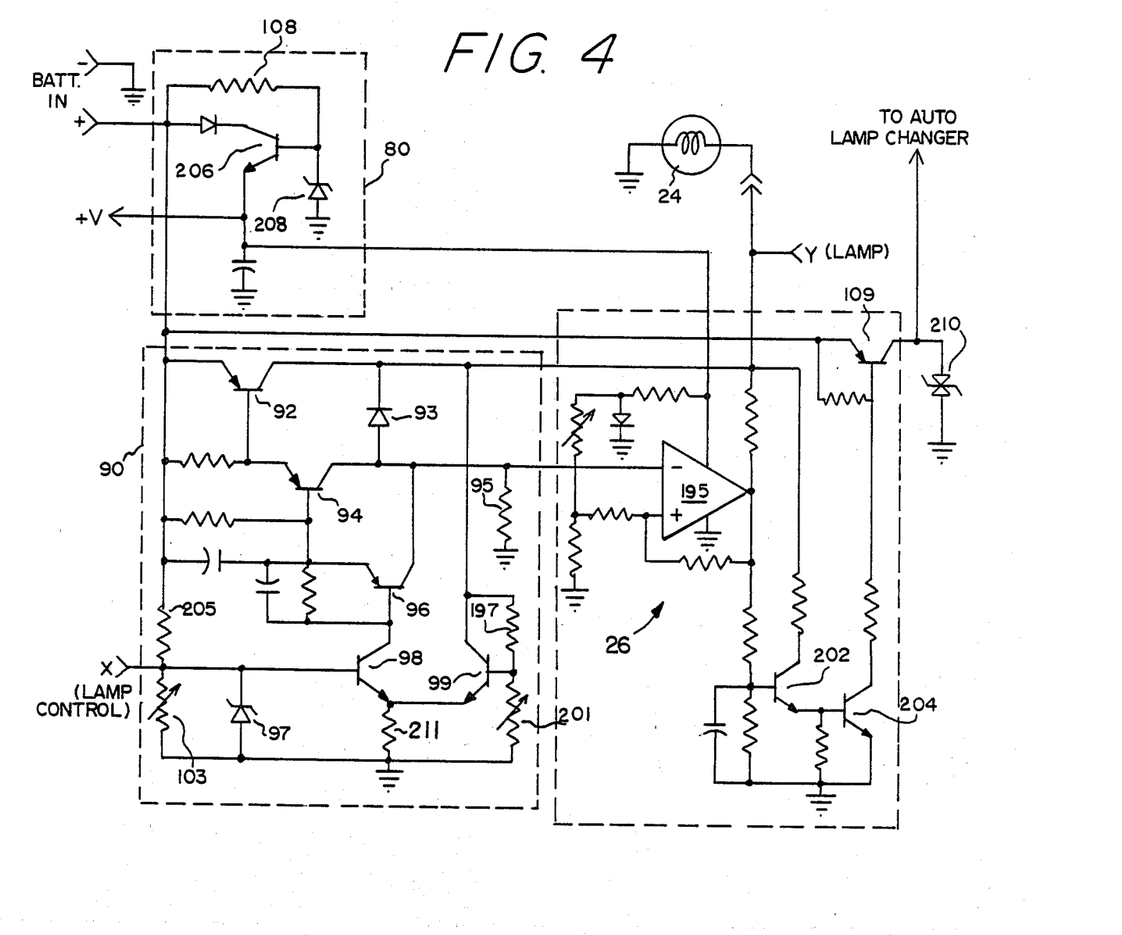
FIG. 4 is a schematic diagram of the voltage regulator and switch portions of a flasher unit.

Having now described the basic operation of my invention, the specific novel circuits will now be explained in more detail. FIG. 4 presents a schematic diagram of the power supply regulators and lamp circuit sensor portions of my invention. This circuit consists of three basic elements: a voltage regulator for the electronic circuits 80, a voltage regulator 90 to control the voltage applied to incandescent lamp 24, and a lamp current sensor 26 which operates a switch composed of transistors 205, 202, and 109.

It is contemplated that my invention will be utilized primarily with flashers operated from a battery-type power supply. The battery supply will vary in output voltage over a battery life or a charging cycle. To maximize the life of an incandescent bulb 24, it is necessary to regulate the voltage across the bulb. With battery operation it is also necessary to minimize the losses in the regulator circuits to maintain proper operation as the battery voltage drops to a value lower than normal. This has been accomplished in the past by using germanium power transistors for switching and regulating the current through the incandescent lamp. Although the drop across the main switching transistor could be held to about 0.5 to 0.6 volts with germanium transistors, these devices have a high leakage current which increases at higher temperatures. In my regulator 90, however, I have used a silicon power transistor 92 as the main switching and regulating element. Advantageously, for low battery voltage, I am able to maintain the voltage drop across transistor 92 much lower than previously possible with a silicon transistor switch and regulator. Transistor 92 is driven by transistor 94 which in turn is driven by main transistor 96. When main transistor 92 is cut off, the collectors of transistors 94 and 96 are connected to the collector of transistor 92 by diode 93 to form a darlington circuit. The collectors of transistors 94 and 96 are connected via bypass resistor 95 to the negative side of the power source which is considered ground in the circuit of FIG. 4. A differential amplifier 98 and 99 is connected in a regulator circuit with voltage reference zener 97 and is used to regulate the collector voltage of transistor 92. When lamp 24 is first turned on, drive current will pass through the emitter-base junction of transistor 92, through transistors 94 and 96, through diode 93 and also through the load. However, as the collector voltage of transistor 92 rises, diode 93 will become reverse biased and the drive current will therefore pass through bypass resistor 95 to ground. Thus, the circuit automatically switches from a darlington circuit to a single transistor circuit driven by another transistor where the drive current is now not part of the load current. With transistor 92 conducting, incandescent lamp filament 24 will draw a heavy current when first energized and will increase in resistance as the filament heats up reducing the drive and load current required. The resulting collector voltage and consequently the voltage across lamp 24 will be determined by zener 97 and the setting of resistor 201 in the regulator circuit formed by transistors 98, 99. When the currents through transistors 94 and 96 flow through bypass resistor 95, the minimum voltage drop between the emitter and collector of transistor 92 is not limited by the collector-to emitter voltages of transistors 94 and 96. When the input voltage drops below the desired regulated output voltage in the usual darlington regulator circuit, the minimum voltage drop across transistor 92 would approach a value determined by the voltage drops across transistors 94 and 96 when the input voltage drops below the desired regulated output voltage.

When the supply voltage is greater than the desired regulated output voltage, the voltage divider formed by resistors 205 and 103 will produce a voltage across zener 97 greater than its zener voltage causing it to conduct. Thus, the base of differential amplifier transistor 98 will be held constant at the reference voltage provided by zener 97. The voltage at the base of transistor 99 will be determined by the voltage divider formed by resistors 197 and 201 from the regulated lamp voltage. The ratio of resistors 197, 201 is adjusted to provide only that current through transistors 94 and 96 which will provide the desired maximum output voltage at the collector of transistor 92.

When the supply voltage to the emitter of switch transistor 92 approaches or drops below the desired value of the regulated output voltage, the voltage at the base of transistor 98 will drop below the breakdown voltage of zener 97 to a value determined by the ratio of voltage divider 205, 103. The base voltage of transistor 99 is determined by the ratio of voltage divider 197, 201. The ratio of resistors 205, 103 is adjusted so as to produce a low predetermined emitter to collector voltage drop across switch transistor 92. This voltage, however, is higher than the drop would be if transistors 98, 96 and 94 were fully on. The addition of resistor 103 to form divider 205, 103 when zener 97 is non-conducting therefore permits limitation of transistor 92 drive current to that current required to maintain the desired minimum voltage drop across transistor 92 at any given load current.

In an alternative embodiment of the circuit of FIG. 4 in which it is only required that transistor 92 switch the load off and on without regulation of the load voltage, zener diode 97 may be omitted and the voltage across switch transistor 92 maintained at a very low value over a wide range of supply voltages. In this case, resistor 103 prevents saturation of transistors 98, 96 and 94. Without resistor 103, the drive current for transistor 92 would be limited only by the value of resistors 95 and 211. In such case, selecting resistor 95 to supply sufficient drive current for a high amperage load would result in excessively high drive current for a low amperage load, representing a waste of energy. With resistor 103, the drive current is dynamically adjusted to only the amount required to maintain the selected voltage drop across transistor 92 for any instantaneous or steady-state value of load current and the drive current can be maintained as a small percentage of the load current for maximum efficiency.

As may now be recognized, the novel voltage dividers associated with differential amplifier 98, 99 and drivers 94, 96 permit the voltage drop across switch transistor 92 to approach saturation but without excessive drive current at any given lamp load current.

As an example of a specific operation of my novel regulator 90, assume that the input voltage may vary between 13 and 18 volts and that an output of 12 volts is desired. With the input voltage in the range of 13 to 18 volts and resistor 103 omitted, the first step is to adjust resistor 201 to give an output voltage of 12 volts. Next, the input voltage is reduced below 12 volts to, for example, 11 volts. Resistor 103 is then inserted and adjusted to give the desired voltage drop from the emitter to the collector of transistor 92 at the highest lamp load for which the unit is designed.

As may be recognized, the voltage drop across bypass resistor 95 will decrease if the lamp filament fails and this voltage can thus be used for sensing such failures. A sensing resistor in series with lamp 24 is therefore not necessary and the power loss such a resistor would cause is eliminated. Accordingly, the voltage across bypass resistor 95 produced by the drive current is sensed by comparator 195. If lamp 24 fails, comparator 195 controls transistor switch 202 which in turn causes switching transistors 204 and 109 to conduct to energize an automatic lamp changer which operates to remove failed lamp 24 and to insert a new lamp.

Regulator 80, which supplies regulated power to the timing circuits of my invention and also to comparator 195, is a simple voltage regulator utilizing transistor 206, zener 208 and resistor 108.

Figure 5:
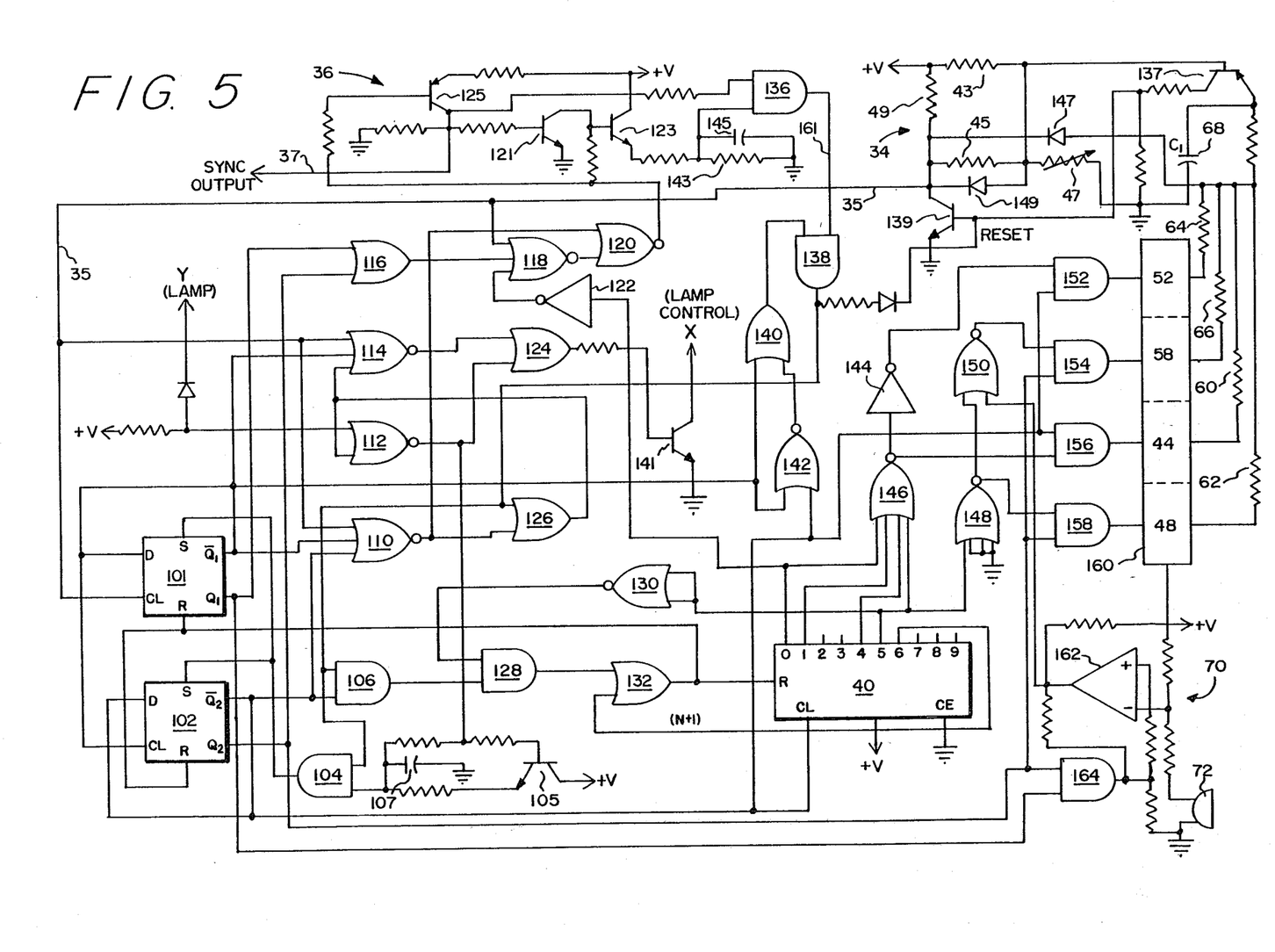
FIG. 5 is a schematic diagram of the logic circuits for producing a sequence of flashes of a flasher unit.
Figure 6:
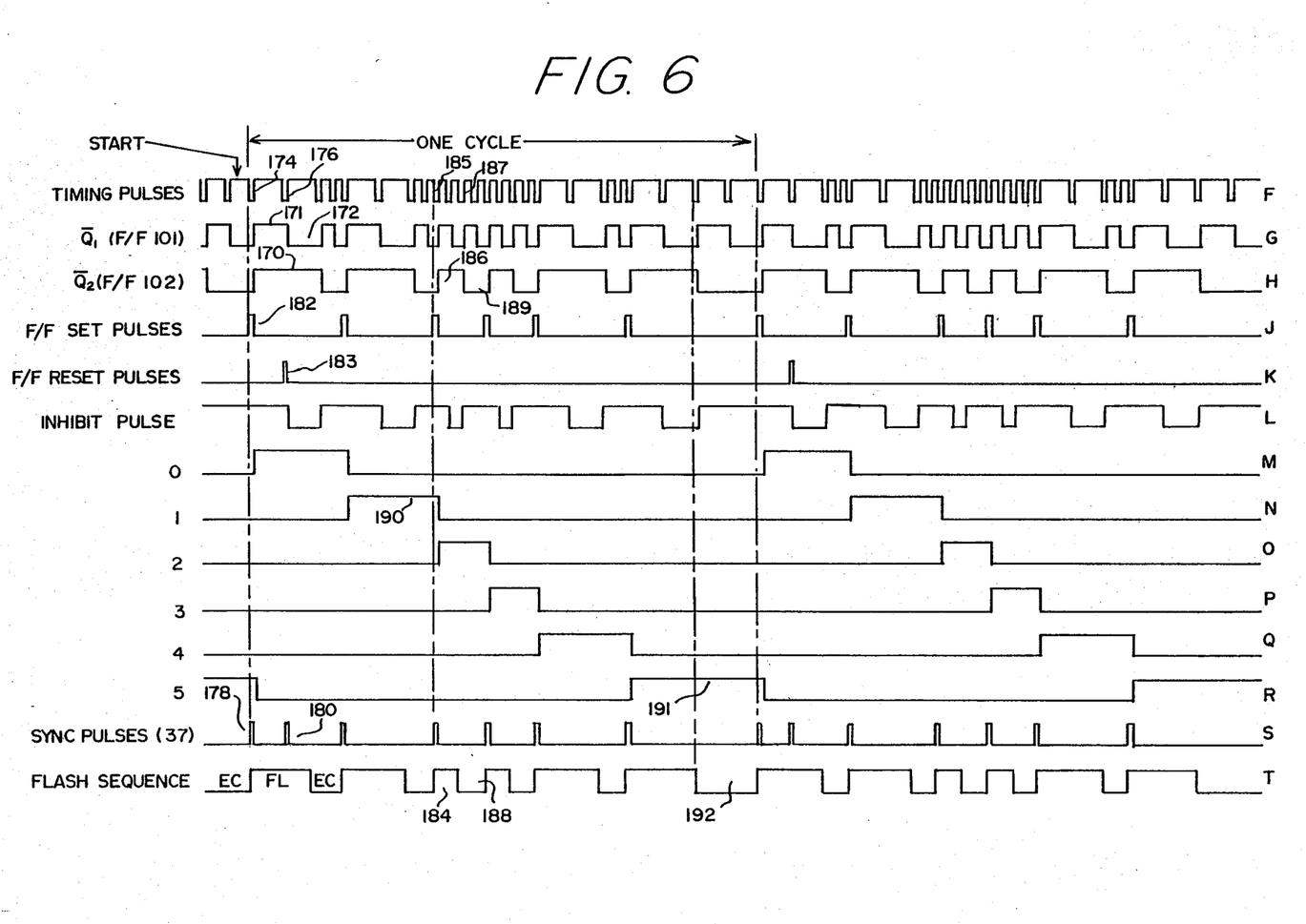
FIG. 6 is a waveform diagram of two cycles of the sequence of flashes produced by the unit shown in FIGS. 4 and 5.

The preferred embodiment of the electronic flash control circuits and timing circuits for my invention is shown in schematic form in FIG. 5, although it will be understood that other circuits to provide the desired functions will be obvious to those of skill in the art. The operation of the circuits illustrated will be explained with reference also to the diagrams in FIG. 6 of waveforms at various points in the circuits. As previously discussed in reference to FIG. 2, my invention can provide up to 10 flash periods with the counter shown to permit a variety of coded signals to be flashed, and, by selection of the values of capacitor 68 and resistors 60, 62, 64, and 66, the durations of the flashes and eclipses can be controlled. It is to be understood that larger counters may be used to provide greater than 10 flash periods. For the circuits of FIG. 5, six periods (N=6) have been selected for illustrative purposes with counter 40 connected to produce the coded flash sequence indicated on line T of FIG. 6. The sequence of two dashes, two dots and two dashes is also, of course, an arbitrary code for illustration. A short eclipse space is provided between successive code elements with a long eclipse at the end of the code. As will be recognized, FIG. 6 shows two complete cycles of the code. It may be noted in FIG. 5, that counter 40 has it counter outputs ZERO and ONE connected to two inputs of quad NOR gate 146 to produce the two long flashes at the beginning of the code and counter outputs FOUR and FIVE are connected to the other two inputs to produce the two long flashes at the end of the code. Quad NOR gate 148 has one input connected to count output FIVE to provide the long eclipse at the end of the code. The remainder of its inputs are grounded as previously discussed.

Flip-flops 101 and 102 are key timing elements in the circuit. As shown on lines G & H of FIG. 6, flip-flops 101 and 102 are interconnected to cause flip-flop 101 to produce equal length HIGH and LOW pulses at its $\bar{Q}$ output for each HIGH or LOW Output pulse from the $\bar{Q}$ output of flip-flop 102. For example, when flip-flop 102 produces a long duration HIGH 170, flip-flop 101 produces HIGH 171 followed by LOW 172 with each being half the duration of HIGH 170. Thus, flip-flop 102 changes state once for each two changes of state of flip-flop 101. The clock and timing generator shown generally at 34 places the sequence of timing pulses, as indicated on line F, on lead 35 which clocks flip-flop 101 and inputs to several gates. The output levels on $Q_1$, $\bar{Q}_1$, $Q_2$, and $\bar{Q}_2$ are utilized to control various gates in the lamp control circuits.

A starting sequence for the flash control system may be illustrated by assuming that the circuits are in the condition indicated by the "start" arrow on line F of FIG. 6, with the timing pulse lead 35 HIGH, $\bar{Q}_1$ and $\bar{Q}_2$ LOW, and lamp OFF. Counter 40 will be in its sixth count. As counter 40 completes its sixth count which appears at output 5, the counter 40, as will be shown, will step to its N+1 or seventh count which appears at output 6 and is connected via OR gate 132 to the reset input of counter 40. The reset pulse to counter 40 also resets both flip-flop 101 and 102. At this point, $\bar{Q}_1$ and $\bar{Q}_2$ are both LOW. When a negative-going timing pulse appears on lead 35 from timing generator 34, all inputs to NOR gate 110 will be LOW producing a HIGH at its output. OR gate 126 output will then be HIGH, producing a HIGH signal at one input of NOR gate 112 and of NOR gate 114. NOR gate 114 will produce a LOW at one input of OR gate 124 which has a LOW on its other input from NOR gate 112. Thus, the LOW produced at the output of OR gate 124 turns off transistor 141.

The collector of transistor 141 connects to input X of FIG. 4 which controls lamp switching transistor 92 via transistors 98 and 99. When transistor 141 is conducting, point X is LOW cutting off the current to lamp 24. Thus, when OR gate 124 turns off transistor 141, the lamp switch is enabled and turns the lamp 24 on. The action of START timing pulse 174 in going LOW also places a HIGH from the output of NOR gate 110 on one input of NOR gate 120. Both $\bar{Q}_1$ and $\bar{Q}_2$ are then HIGH producing a HIGH at the input of NOR gate 118 which has a LOW input from lead 35. Thus, NOR gate 120 produces a LOW output, turning transistor 125 on, causing its collector and sync output lead 37 to go HIGH. This produces the leading edge of sync pulse 178 on line S of FIG. 6. It may be noted that sync pulse 178 occurs at essentially the same time as START timing pulse 174. When START timing pulse 174 goes positive (trailing edge), flip-flops 101 and 102 are clocked producing pulses 171 and 170 at $\bar{Q}_1$ and $\bar{Q}_2$ shown on lines G and H. The output of NOR gate 110 then goes LOW causing the output of NOR gate 120 to be HIGH. Transistor 125 is thus turned off and lead 37 goes LOW. The action just described therefore produces sync pulse 178 on lead 37. When transistor 125 turns on, transistor 121 also turns on and transistor 123 turns off.

Prior to START timing pulse 174, transistor 123 was on, charging capacitor 145. When the first sync pulse 178 occurs, one input of AND gate 136 goes HIGH with the other input being HIGH from the charge on capacitor 145. Therefore a HIGH appears at the output of AND gate 136. Resistor 143 is selected to discharge capacitor 145 to inhibit AND gate 136 before the end of the sync pulse 178. This action results in sync pulses 178 and 180 being duplicated on lead 161 but of shorter duration to prevent lead 161 from remaining high which would cause a lock-on condition at the reset input of transistor 139. Flip-flop 101 and 102 are set by the short set pulses 182 (line J of FIG. 6) and are reset by short pulses 183 through gate 132 which also resets counter 40. The short pulse 183 on lead 161 to AND gate 138 is also conducted to the base of transistor 139 of clock and timing generator 34, resetting the generator. AND gate 106 has both inputs HIGH; therefore, the reset pulse is propagated to reset counter 40.

It may be noted that the output of NOR gate 118 goes HIGH during the timing pulse 176 which occurs at the middle of each flash in the flash sequence. When the ZERO counter output shown on line M is present, timing pulse 176 produces second sync pulse 180 on line S of FIG. 6. This pulse is therefore propagated through NOR gate 120 to cause the signal on sync output line 37 to go HIGH. Inverter 130 whose output is connected to one input of AND gate 128 serves to inhibit a reset pulse which might occur from a distant unit during the last count of counter 40 if the last flash were a long one. Second sync pulse 180, which appears on sync output 37, will be transmitted to all other flasher systems in the network, and will reset each of the counters in the other flasher systems connected to sync line 37 through their corresponding gates 136, 138, 106, 128 and 132. If all of the flasher systems in a group were not synchronized, the first flasher system to reach the ZERO count will cause generation of the sync pulse 180 and will reset all of the other except any which happen to be on the last count. However, when such a unit goes to its ZERO count, the sync pulse generated will in turn reset and therefore resynchronize all of the other units to that unit.

From the description above of the turn on sequence of the lamp, it will be seen that turn off of the lamp is controlled by a LOW input to NOR gate 114 which places a HIGH input on OR gate 124 turning on transistor 141. Transistor 141, when conducting, places a LOW on the X input to the lamp switching circuits of FIG. 4 causing the lamp to be turned off. NOR gate 112 acts as a latch to hold transistor 141 on until the next turn on signal occurs. During a turn on pulse, a HIGH signal from the output of AND gate 104 sets flip-flops 101 and 102 causing $\bar{Q}_1$ and $\bar{Q}_2$ to go LOW. During an eclipse, transistor 105 is conducting and charges capacitor 107 permitting a sync signal on AND gate 104 to produce a HIGH at the output for setting of flip-flops 101 and 102. Transistor 105 turns OFF, permitting discharge of capacitor 107 which inhibits AND gate 104. The set pulse is thus shortened and cannot appear again during a flash period since the capacitor will remain discharged. It may be noted that during synchronization, both the sync pulse and the counter reset pulse from the output of AND gate 130 will also appear at transistor 139 in the clock and timing generator causing it to reset as will be discussed below.

The next timing pulse 176 will occur while $\bar{Q}_1$ and $\bar{Q}_2$ are both HIGH as shown by pulses 171 and 170 in FIG. 6. Lead 35 to one input of NOR gate 118 will go LOW. The ZERO output of counter 40, as seen on line M of FIG. 6, will be HIGH and inverter 122 will cause a second input to NOR gate 118 to go LOW. $Q_1$ and $Q_2$ outputs are LOW, causing a LOW from the output of OR gate 116 to the third input of NOR gate 118. Thus, its output is HIGH to one input of NOR gate 120 whose other input is held LOW by NOR gate 110. The output of NOR gage 120 then goes LOW turning on transistor 125 to produce the HIGH sync pulse on output lead 37 as previously described. At the end of timing pulse 176, the input to NOR gate 118 goes HIGH causing sync output line 37 to go LOW. It is to be noted that the enabling of the sync pulse by means of NOR gate 118 requires that the input from counter 40 via inverter 122 produce a LOW on that input to NOR gate 118. This can only happen during the ZERO count and therefore no sync pulses appear during the rest of the cycle. The reset pulse produced on lead 161 during the second sync pulse 180 during the ZERO count will again reset clock and timing sequence generator 34 and will also be passed through AND gate 106, AND gate 128, and OR gate 132 to the reset terminals of flip-flops 101 and 102. As may now be recognized, sync pulses 178 and 180 on sync output 37 will appear at all of the other interconnected flash lamp systems. An incoming sync pulse will be conducted via the units own gates 136 and 138 to its clock and timing generator, resetting the same and, via gates 106, 128 and 132, resetting the counter. This will start that unit in synchronism with the transmitting unit to provide the desired simultaneous flashing among all units in this system. On line L in FIG. 6, a series of inhibit pulses are shown. These negative going pulses are produced by gate 140 during the last half of each flash period to inhibit gate 138 which prevents the unit from resetting on an incoming sync pulse arriving during such time.

Turning now to the circuits of the clock and timing generator shown generally at 34 in FIG. 5 and with reference to line F on FIG. 6, its operation will be described. Timing generator 34 utilizes transistor 137 and transistor 139. The base of transistor 137 is held at a fixed bias voltage by the voltage divider formed by resistor 43 and variable resistor 47. Variable resistor 47 may be adjusted to provide the desired bias. Transistor 139 is non-conducting during the period between timing pulses such as START pulse 174 and pulse 176 of FIG. 6 thereby producing a HIGH output on lead 35. When transistor 139 conducts, its collector voltage drops producing a LOW on lead 35 during a timing pulse. Immediately after a timing pulse, one of the bilateral switches 52, 58, 44 or 46 is closed by the selected gating circuits causing capacitor 68 ($C_1$) to begin to charge through the selected resistor. Using timing pulse 174 of FIG. 6 as an example, switch 52 is closed connecting resistor 64 to the +V regulated power supply, charging capacitor 68. When the voltage on capacitor 68 rises sufficiently to overcome the bias on the base of transistor 137, that transistor will conduct placing a HIGh on the base of transistor 139 whose collector then goes LOW as described above. The charge on capacitor 68 will be dumped by diode 149 with diode 147 serving to hold the output of resistor 64 LOW to prevent recharge of capacitor 68 during the timing pulse period. When the charge is quickly removed from capacitor 68, the LOW at the collector of transistor 139, in a regenerative fashion, cuts off transistor 137 permitting capacitor 68 to recharge through resistor 64 connected to capacitor 68 by switch 52. It is to be noted that switch 52 has been held ON by the ZERO count output from counter 40 as shown on line M of FIG. 6 and is therefore still conducting. Diode 147, as noted, prevents recharging of capacitor 68 during the timing pulse 176 which occurs at the center of a flash or an eclipse. As may also now be seen, a reset pulse from AND gate 138 to the base of transistor 139 will cause transistor 139 to conduct producing a timing pulse and starting a new timing cycle.

Bilateral switches 52, 58, 44, and 48, which may be elements of a quad switch 160, are closed by their respective AND gates 152, 154, 156, and 158. When a short flash is required, such as 184 on line T of FIG. 6, during count TWO of counter 40, START timing pulse 185 clocks flip-flops 101 and 102 causing HIGH 186 at $\bar{Q}_2$. This HIGH appears at one input of AND gate 156 which has a HIGH on its other input from OR gate 146 whose inputs are all LOW. Thus, a HIGH at the output of 156 turns on gate 44 for the period that $\bar{Q}_2$ remains HIGH. When STOP timing pulse 187 occurs, flip-flop 102 is clocked by flip-flop 101 producing the LOW at $\bar{Q}_2$ shown at 189 in FIG. 6. Short eclipse 188 on line T is next required and is accomplished by the HIGH from $Q_2$ appearing at one input of AND gate 158 with the other input being HIGH from the output of NOR gate 148. Switch 48 is therefore closed connecting resistor 62 to charge capacitor 68. Since resistors 60 and 62 in this instance have equal values, the charging times will be the same as for the short flash and therefore transistor 141 will be controlled to maintain the lamp off during eclipse 188 for the same time period as flash 184. It is to be emphasized that it is not necessary that the short flash and short eclipse have the same duration. For example, resistor 60 may be selected to produce a short flash of 0.3 seconds and resistor 62 selected to produce a short eclipse of 0.7 seconds.

The long flashes and long eclipse are controlled by switches 52 and 58, respectively, with gates 152 and 154 maintained inhibited during short flashes and eclipses by the inverting action of inverter 144 and NOR gate 150. When a long flash is required, such as at count ONE, the count pulse 190 on line N of FIG. 6 is applied to one input of NOR gate 146 producing a LOW at its output which via inverter 144, places a HIGH on one input of AND gate 152. The other input receives a HIGH from $\bar{Q}_2$ turning on switch 52. Similarly, a long eclipse is obtained by a HIGH on NOR gate 148 which in this case would occur at count FIVE, 191 on line R of FIG. 6. The basic pulse generating and timing circuit described above as applied to the present invention has been disclosed in my U.S. Pat. No. 3,596,113 and is incorporated herein by reference.

NOR gate 150 between NOR gate 148 and AND gate 154 is advantageously utilized in the daylight control circuit shown generally at 70 to disable the flashing system during daylight hours and to start the system during night time or heavily overcast conditions. During the day when sufficient light falls on photocell 72 to make the minus input of comparator 162 lower than the plus input, its output will become HIGH, causing the output of NOR gate 150 to be LOW, inhibiting AND gate 154. However, the above action will take place only when AND gate 164 is enabled by $Q_1$ and $Q_2$ being high simultaneously. As evident from FIG. 6, this condition occurs only during the last half of each eclipse. Thus, when the sequence reaches the second half of the next long eclipse, AND gate 154 is disabled, capacitor 68 will discharge turning transistor 137 on. Capacitor 68 cannot recharge since switch 58 remains open until comparator 162 changes state again. Therefore, the clock and timing lead 35 will remain HIGH and the flashing sequence will stop. When the light on photocell 72 drops low enough to cause the voltages at the input of comparator 162 to change so as to put a LOW at its output when AND gate 164 is enabled by HIGHS on $Q_1$ and $Q_2$, this action will enable OR gate 150 to permit capacitor 68 to recharge. AND gate 164 is disabled by a LOW on $Q_1$ of flip-flop 101 during the first half of each eclipse, disabling comparator 162. This action prevents the glow from the filament of lamp 24 during nigressence from causing shut down of the flash system.

Although the invention has been described hereinabove in detail using various specific elements, it will be obvious that many modifications can be made without departing from the spirit and scope of the invention. For example, it is contemplated that the circuits shown herein may be implemented in LSI thereby reducing the size and cost.

I claim:

1. Apparatus for producing a preselected sequence of flashes and eclipses from a lamp comprising:
    lamp control means connected to said lamp for energizing said lamp during a flash period;
    timing generator means connected to said lamp control means for producing a start timing pulse for starting a flash period and a stop timing pulse for terminating a flash period;
    flash period control means connected to said timing generator means for controlling the time between said start timing pulse and said stop timing pulse, said flash period control means having a set of short flash gates connected to said lamp control means and enabled by said lamp control means when a short flash is required, said short flash gates having a short flash control input and a set of long flash gates connected to said lamp control means and enabled by said lamp control means when a long flash is required, said long flash gates having a long flash control input;
    eclipse period control means connected to said timing generator means for controlling the time between said stop timing pulse and said start timing pulse, said eclipse period control means having a set of short eclipse gates connected to said lamp control means, and enabled by said lamp control means when a short eclipse is required, said short eclipse gates having a long eclipse control input;
    counter means having a set of sequential count outputs, the number of said count outputs selected to be equal to the number of flashes in said preselected sequence, each of said count outputs connected to selected ones of said flash and eclipse gate control inputs for controlling said flash period and said eclipse period to produce the durations of the flash and the eclipse preselected for each position in said preselected sequence, said counter means having its clocking input connected to said timing generator means for receiving each of said start timing pulses to cause each count output to have a duration equal to the time between its clocking start timing pulse and the next clocking start timing pulse;
    a set of electronic switch means having switches connected respectively to the outputs of said short flash gates, said short eclipse gates, said long flash gates, and said long eclipse gates; and
    a series resistance-capacitance timing circuit having the capacitance thereof connected to all of said electronic switch means, and in which the resistance thereof is a separate resistor connected to each of said electronic switch means whereby enabling of one of said gates causes the associated one of said electronic switches to close to thereby connect the one of said resistors associated with said closed gate in series with said capacitance to establish a selected long or short duration.

2. The apparatus as defined in claim 1 which further comprises synchronization pulse generation means connected to said lamp control means and having a synchronization outout/input terminal, said synchronization pulse generation means controlled to produce at said output terminal a short first synchronization pulse at the beginning of each flash period in said sequence.

3. The apparatus as defined in claim 2 in which said synchronization generator means produces a short second synchronization pulse at said synchronization output only during the zero count of said counter.

4. The apparatus as defined in claim 2 in which said lamp control means is adapted to energize said lamp responsive to an external first synchronization pulse received at said synchronization output/input terminal.

5. The apparatus as defined in claim 4 in which said counter means is adapted to reset to its zero count responsive to an external second synchronization pulse received at said synchronization output/input terminal during a flash.

6. The apparatus as defined in claim 1 which further comprises:
    daylight control means responsive to incident ambient light for disabling said timing generator means when said incident light is greater than a preselected level, said daylight control means responsive to incident ambient light for enabling said counter means when said incident light falls below such preselected level.

7. The apparatus as defined in claim 6 in which said daylight control means includes:
    photocell means adapted to receive incident ambient light; and
    comparator means connected to said photocell means for comparing the output from said photocell means to a pre-established threshold.

8. The apparatus as defined in claim 6 in which said daylight control means further includes gating means connected to said timing generator means for inhibiting the operation of said comparator means during nigressence of said lamp.

9. A system of flashing beacons for buoys and the like having a plurality of spaced apart flasher units interconnected by communication links, said beacons each producing a preselected sequence of flashes and eclipses representative of an identification code or the like and in which all beacons flash in synchronism, comprising:
lamp means at each of said flasher units;
flash and eclipse period generation means in each of said flasher units for producing a set of lamp control pulses for each sequence of flashes and eclipses, said set defining the preselected sequence, said pulses energizing said lamp means during the flash periods of said set;
synchronization pulse generation means for producing a first synchronizing pulse at the beginning of each flash and a second synchronizing pulse following said first synchronizing pulse occurring only during the first pulse in said set;
output means connected to said synchronization pulse generation means for transmitting said synchronization pulses from each of said flasher units to all others of said flasher units; and
synchronizing means in each of said flasher units for resetting its said flash and eclipse period generation means to the beginning of a set when synchronizing pulses are received from another flasher unit by a unit which is out of synchronization, said synchronizing means responsive only to said second synchronizing pulse.

10. The system as defined in claim 9, which further comprises:
photo sensitive means for producing a sequence inhibiting control signal in response to daylight incident thereon;
said flash and eclipse period generation means is responsive to said control signal to cease producing said lamp control pulses.

11. The system as defined in claim 10, in which said flash and eclipse period generation means is responsive to said control signal only when said synchronization pulses are not being received from other flasher units in said system.

12. The system as defined in claim 10 in which said photo sensitive means includes control means for producing said lamp control pulses in the absence of daylight incident thereon, said control means including inhibit means for preventing production of said sequence inhibiting control signal during the nigressence of said lamp.

13. The system as defined in claim 9 in which each of said flasher units is operable independently of the other flasher units in said system whereby said units are unaffected by failure of said communications links.

* * * * *